United States Patent
Li et al.

(10) Patent No.: US 8,078,212 B2
(45) Date of Patent: Dec. 13, 2011

(54) METHOD AND APPARATUS FOR ALLOCATING POWER IN A MU-MIMO COMMUNICATION SYSTEM

(75) Inventors: Guangjie Li, Beijing (CN); Yang Gao, Beijing (CN); May Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 12/057,194

(22) Filed: Mar. 27, 2008

(65) Prior Publication Data

US 2009/0047987 A1    Feb. 19, 2009

Related U.S. Application Data

(60) Provisional application No. 60/955,155, filed on Aug. 10, 2007.

(51) Int. Cl.
*H04B 7/00* (2006.01)

(52) U.S. Cl. ........................................ 455/522; 370/318

(58) Field of Classification Search .................... 455/69, 455/522; 370/318
See application file for complete search history.

(56) References Cited

U.S. PATENT DOCUMENTS

| | | | |
|---|---|---|---|
| 7,027,415 B1 * | 4/2006 | Dahlby et al. | 370/322 |
| 2006/0285504 A1 * | 12/2006 | Dong et al. | 370/254 |
| 2007/0149236 A1 * | 6/2007 | Naden et al. | 455/522 |

* cited by examiner

*Primary Examiner* — Raymond Dean
(74) *Attorney, Agent, or Firm* — Thorpe North & Western LLP

(57) ABSTRACT

Machine-readable media, methods, apparatus and system for allocating power in a MU-MIMO communicating system are described. In some embodiments, an apparatus of a base station in the MU-MIMO communication system may comprise: a power calculating logic to calculate a power for each user of a plurality of users communicating with the base station in the MU-MIMO system, based upon an average power and a power increment. The power calculating logic may further comprise an average power logic to calculate the average power among the plurality of users based upon a total power for the base station to communicate with the plurality of users, and a power increment logic to determine the power increment for the each user based upon at least one of a fairness algorithm and a throughput algorithm, and wherein different users of the plurality of users having different long-term signal to interference plus noise ratios (SINRs) are calculated with different powers. The apparatus may further comprise a power allocating logic to allocate the power to the each user.

9 Claims, 4 Drawing Sheets

METHOD AND APPARATUS FOR ALLOCATING POWER IN A MU-MIMO COMMUNICATION SYSTEM

This application claims priority to the provisional application No. 60/955,155, filed on Aug. 10, 2007.

BACKGROUND

Multi-user multiple-input and multiple-output (MU-MIMO) communication system is a set of advanced multiple-input and multiple-output (MIMO) technology that exploits effective usage of communication resource (e.g., time-frequency resource). A widely known scheme of MU-MIMO is Space-division multiple access (SDMA) that allows a base station (BS) to receive or transmit signal from or to multiple users in a same resource block (e.g., a time-frequency block).

Currently, for MU-MIMO communication system, an equal-power allocation scheme is used for the BS to allocate power among the multi-users in the same resource block, namely, each user in the resource block is allocated with the same power to communicate with the BS.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes method and apparatus for allocating power in a MU-MIMO communication system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or sending information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
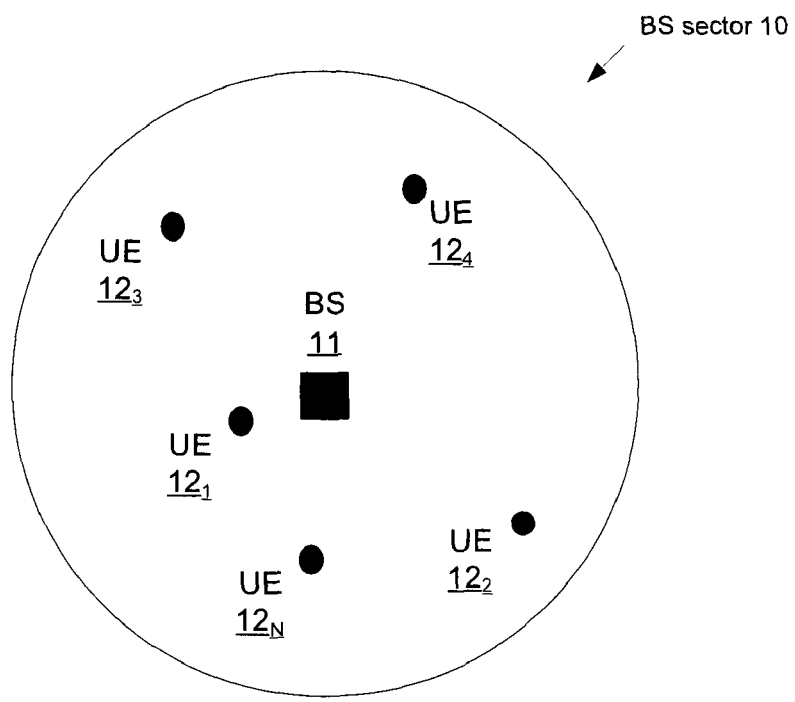
FIG. 1 shows an embodiment of a base station sector in a wireless communication system.

FIG. 1 shows an embodiment of a base station sector 10 in a multi-user multiple-input and multiple-output (MU-MIMO) communication system, which may apply the space-division multiple access mode (SDMA). Base station sector 10 may be a service sector covered by a base station 11 to receive or transmit signal from or to a plurality of users (UEs) such as UE $12_1$-UE $12_N$. Examples of the UEs may comprise portable computers, laptop computers, tablets, personal digital assistants (PDAs), handheld devices, entertainment devices such as audio and/or video devices, and other devices for processing or transmitting information in a wireless environment.

Figure 2:
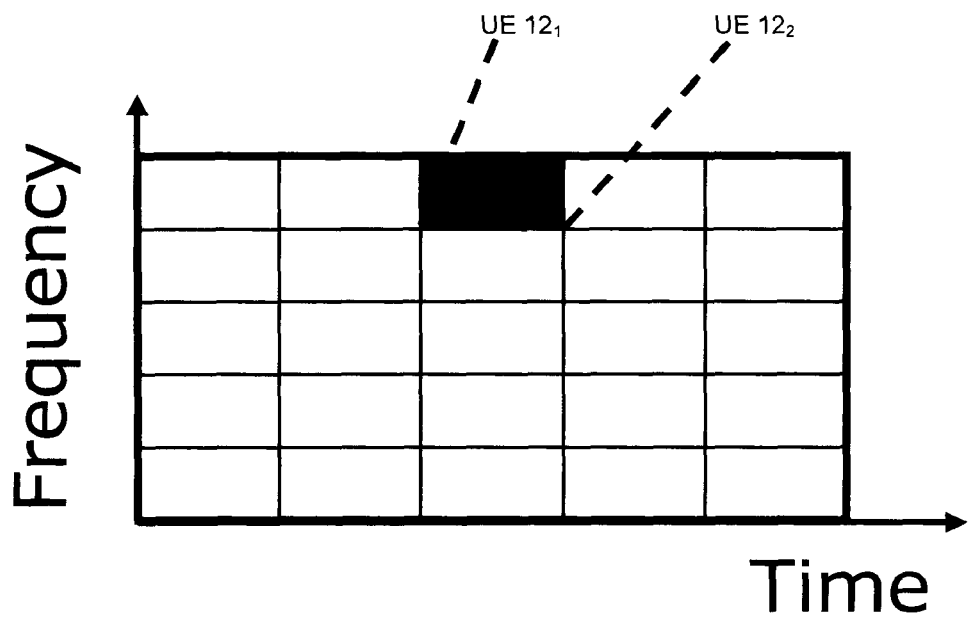
FIG. 2 shows an embodiment of resource blocks in the base station sector.

FIG. 2 shows an embodiment of communication resource blocks for BS sector 10. In the embodiment, base station 11 may divide communication resources of base station sector 10 into several small blocks, such as resource blocks that may be defined by time slots and frequency domains. According to the MU-MIMO scenario, base station 11 may select two or more UEs from the plurality of UEs (e.g., UE $12_1$ and UE $12_2$) based upon a scheduling algorithm, and allocate a communication resource block (e.g., a time-frequency block) to the selected UEs so that base station 11 may receive or transmit data from or to the selected UEs in the resource block, for example, in a same time slot and frequency domain, simultaneously.

Figure 3:
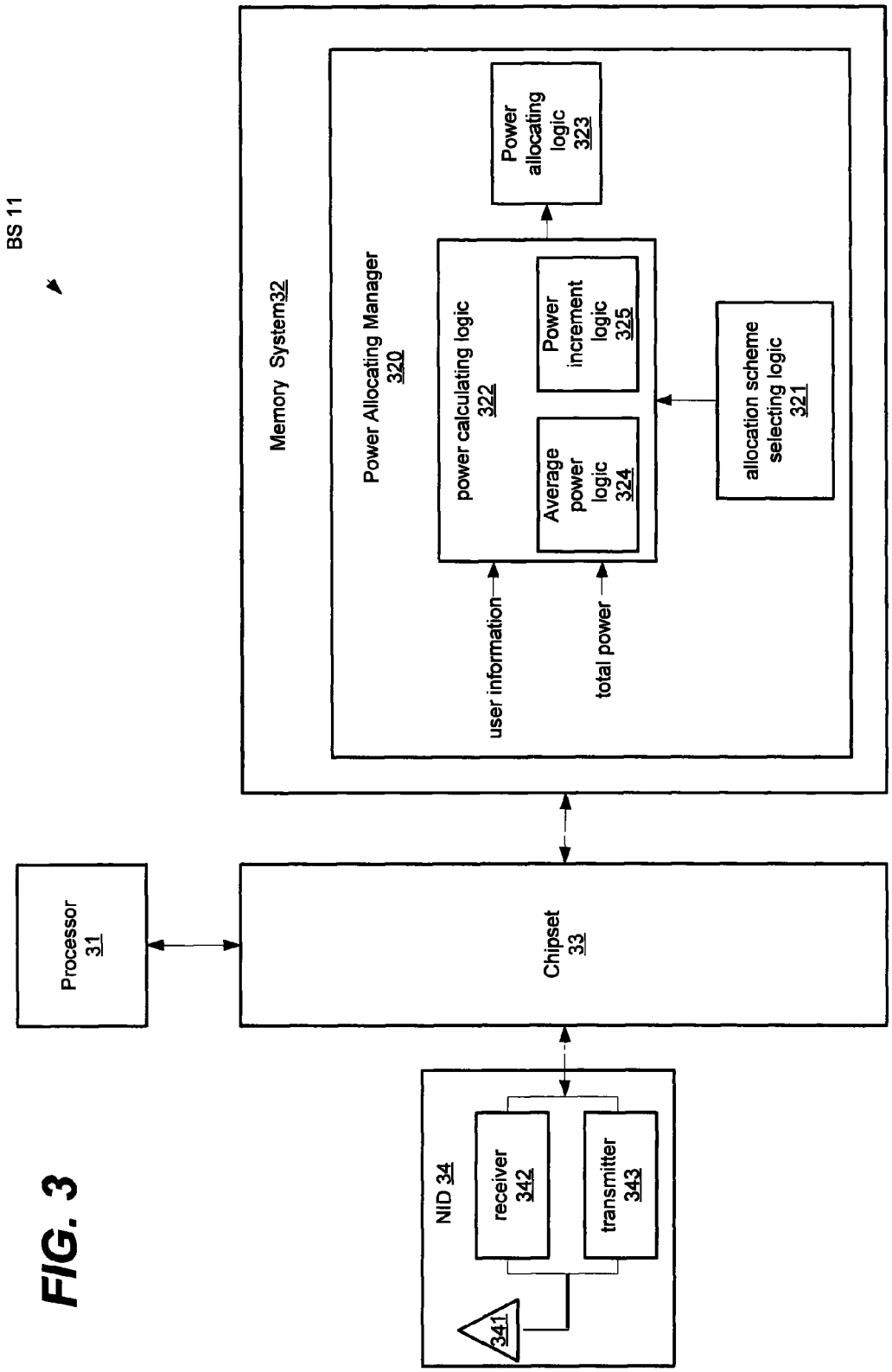
FIG. 3 shows an embodiment of a power allocating manager for allocating power among multi-users in a same resource block.

FIG. 3 shows an embodiment of base station 11. Base station 11 may comprise one or more processor 31, memory system 32, chipset 33, network interface device (NID) 34, and possibly other components.

One or more processors 31 may be communicatively coupled to various components (e.g., the chipset 33) via one or more buses such as a processor bus. Processors 31 may be implemented as an integrated circuit (IC) with one or more processing cores that may execute codes under a suitable architecture.

Memory 32 may store instructions and data to be executed by the processor 31. Examples for memory 32 may comprise one or any combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

In an embodiment, memory 32 may store instructions and data functioning as a power allocating manager 320 that may allocate power among multiple users in the same resource block, such as UE $12_1$ and UE $12_2$, so that base station 11 may communicate with each user by the allocated power. The power may not be equally allocated among the users. In one embodiment, the power may differ among different users. In another embodiment, the power may differ among different groups of users, in which the users in the resource block may be grouped based upon their individual long-term SINRs.

Power allocating manager 322 may comprise allocation scheme selecting logic 321, power calculating logic 322, and power allocating logic 323. Allocation scheme selecting logic 321 may select an allocation scheme from a group of allocation schemes including a fairness scheme and a throughput scheme. In an embodiment, according to the fairness scheme, if a user (e.g., UE $12_1$) having a long-term signal to interference plus noise ratio (e.g., SINR 1) is allocated with power (e.g., P 1) while another user (e.g., UE $12_2$) having another long-term signal to interference plus noise ratio (e.g., SINR 2) is allocated with power (e.g., P 2), and if SINR 1 is lower than SINR 2, then P 1 is higher than P 2 while the total power for BS 11 to communicate with the multiple users in the resource block may keep unexceeded.

In another embodiment, according to the fairness scheme, the plurality of users communicating with BS 11 via the same resource block may be grouped based upon their individual long-term SINRs. For example, users having long-term SINRs that fall into a first range (e.g., 0-5 db) may be grouped as group 1, and users having long-term SINRs that fall into a second range (>=15 db) may be grouped as group 2. If the first range is lower than the second range, then the power allocated to the users of group 1 is higher than the power allocated to the users of group 2, while the total power for BS 11 to communicate with the multiple users in the resource block may keep unexceeded.

In an embodiment, according to the throughput scheme, power may be allocated to each of the multiple users that communicate with BS 11 via the same resource block in such a way that a throughput sum for the multiple users may reach a maximum, while the total power assigned for BS 11 to communicate with the multiple users may keep unexceeded. In the embodiment, a user in a middle SINR range may be assigned with more power compared with users in other SINR ranges. The middle SINR range may be determined by considering SINRs for all of the users in BS sector 10 (e.g., UE $12_1$-UE $12_N$).

Power calculating logic 322 may calculating power allocated to each user of the multiple users communicating with BS 11 via the same resource block based upon the allocation scheme selected by allocation scheme selecting logic 321. Power calculating logic 322 may further include an average power logic 324 and a power increment logic 325. Average power logic 324 may calculate an average power based upon the total power for BS 11 to communicate with the multiple users (e.g., UE $12_1$ and UE $12_2$) via the resource block and the number of the multiple users.

Power increment logic 325 may calculate a power increment for each user of the multiple users communicating with BS 11 via the resource block based upon the allocation scheme selected by allocation scheme selecting logic 321. For example, if the fairness scheme is selected, then power increment logic 325 may calculate the power increment for each user based upon its long-term SINR. In an embodiment, if the user has a low long-term SINR, a high power increment may be calculated for the user. On the contrary, if the user has a high long-term SINR, a low power increment may be calculated for the user. The power increment for each user may be calculated in such way that the total power for the multiple users may kept unexceeded.

In another embodiment, the multiple users may be grouped based upon their individual long-term SINRs, and each group of user(s) may have long-term SINR(s) that fall into a certain range. In the embodiment, power increment logic 325 may calculated power increment for each group of user(s). The group of user(s) whose long-term SINR(s) falls into a low range may be allocated with a high power increment, while the group of user(s) whose long-term SINR(s) falls into a high range may be allocated with a low power increment. The power increment for each user may be calculated in such way that the total power for the multiple users may kept unexceeded. For example, if UE $12_1$ having the long-term $SINR_1$ lower than 5 db is grouped into group 1 and UE $12_2$ having the long-term $SINR_2$ higher than 15 db is grouped into group 2, power increment logic 325 may determine the power increment for UE $12_1$ as $SINR_2$-15 db, and the power increment for UE $12_2$ as 15 db-$SINR_2$.

If the throughput scheme is selected, power increment logic 325 may calculated the power increment for each of the multiple users in the same resource block according to the equation:

$$\text{MaxSum\_C} = \sum_{i}^{N} f_i\left(\frac{(P/N + \Delta P_i)}{I_i + \sigma_i^2}\right), \quad (1)$$

$$\text{while } \sum_{i}^{N} (P/N + \Delta P_i) \leq P$$

wherein, MaxSum_C represents a maximum of a throughput sum C, i represents an $i^{th}$ user, N represents a number of the plurality of users, P represents the total power, $I_i$ represents an interference for the $i^{th}$ user, $\sigma_i$ represents a white noise for the $i^{th}$ user, $f_i()$ represents a throughput function, and $\Delta P_i$ represents the power increment for the $i^{th}$ user.

In order to obtain the power increment $\Delta P_i$, the Lagrange equation may be applied:

$$F = \sum_{i}^{N} f_i\left(\frac{(P/N + \Delta P_i)}{I_i + \sigma_i^2}\right) + \lambda \sum_{i=1}^{N} \Delta P_i \quad (2)$$

wherein, F represents a Lagrange function, and $\lambda$ is a Lagrange multiplier.

Considering the slope of function f may not change much at $$\frac{P/N + \Delta P_i}{I_i + \sigma_i^2}$$

compared with $$\frac{P/N}{I_i + \sigma_i^2} \text{ and } \frac{P/N}{I_i + \sigma_i^2} = SINR_i,$$

the Lagrange equation may yield the followings $$\begin{cases} F'_{\Delta P_1} = \dfrac{\dfrac{P/N+\Delta P_1}{I_1+\sigma_1^2} f_1'\left(\dfrac{P/N+\Delta P_1}{I_1+\sigma_1^2}\right)+}{\lambda = \left(SINR_1 + \dfrac{\Delta P_1}{I_1+\sigma_1^2}\right) f_1'(SINR_1) + \lambda = 0} \\ F'_{\Delta P_2} = \dfrac{\dfrac{P/N+\Delta P_2}{I_2+\sigma_2^2} f_i'\left(\dfrac{P/N+\Delta P_2}{I_2+\sigma_2^2}\right)+}{\lambda = \left(SINR_2 + \dfrac{\Delta P_2}{I_2+\sigma_2^2}\right) f_2'(SINR_2) + \lambda = 0} \\ \cdots \\ \sum_{i=1}^{N} \Delta P_i = 0 \end{cases} \quad (3)$$

Taking the resource block serving two users as an example, the following equation may be derived from the above:

$$\begin{bmatrix} \Delta P_0 \\ \Delta P_1 \end{bmatrix} = \begin{bmatrix} 1 & \dfrac{f_2'(SINR_2)}{I_2 - \sigma_2^2} \\ \dfrac{f_1'(SINR_1)}{I_1 + \sigma_1^2} & 1 \end{bmatrix}^{-1} \times \begin{bmatrix} SINR_2 + SINR_1 \\ 0 \end{bmatrix} \quad (4)$$

$$\text{Then, } \Delta P_0 = -\Delta P_1 = \dfrac{(SINR_2 f_2'(SINR_2) - SINR_1 f_2'(SINR1))}{\left(\dfrac{f_1'(SINR_1)}{I_1 + \sigma_1^2} - \dfrac{f_2'(SINR_2)}{I_2 + \sigma_2^2}\right)} \quad (5)$$

Figure 4:
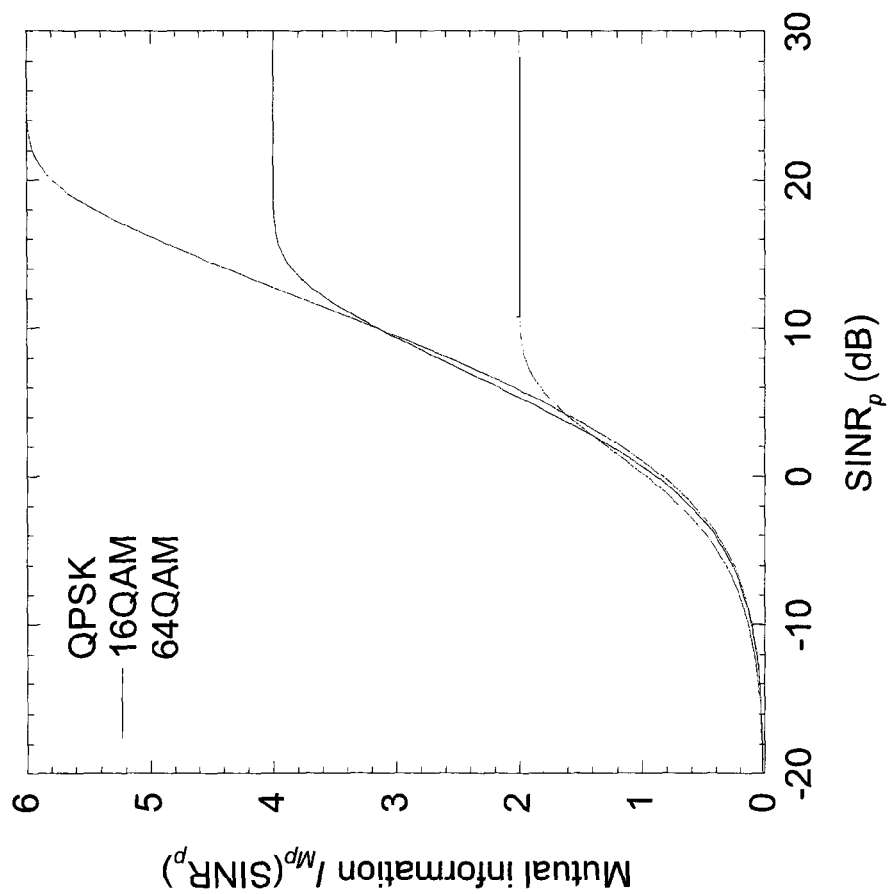
FIG. 4 shows mutual information vs. SINR obtained based upon an allocation scheme.

FIG. 4 shows mutual information vs. SINR obtained from the above equations. As shown, in the middle range of SINRs, the slope of the curve is the sharpest, while in the low and high range of SINRs, the curve is flat. It can be derived from FIG. 4 that gain of the power allocated to a user in the middle SINR range may result in a most throughput. Therefore, the user in the middle SINR range may be calculated with more power increment for the purpose of increasing the system throughput.

With the average power calculated by average power logic 324 and power increment calculated by power increment logic 325, power calculating logic 322 may be able to calculate power for each user served by the resource block through adding the power increment for the each user to the average power.

Power allocating logic 323 may allocate the power calculated by power calculate logic 322 to the each user.

Figure 5:
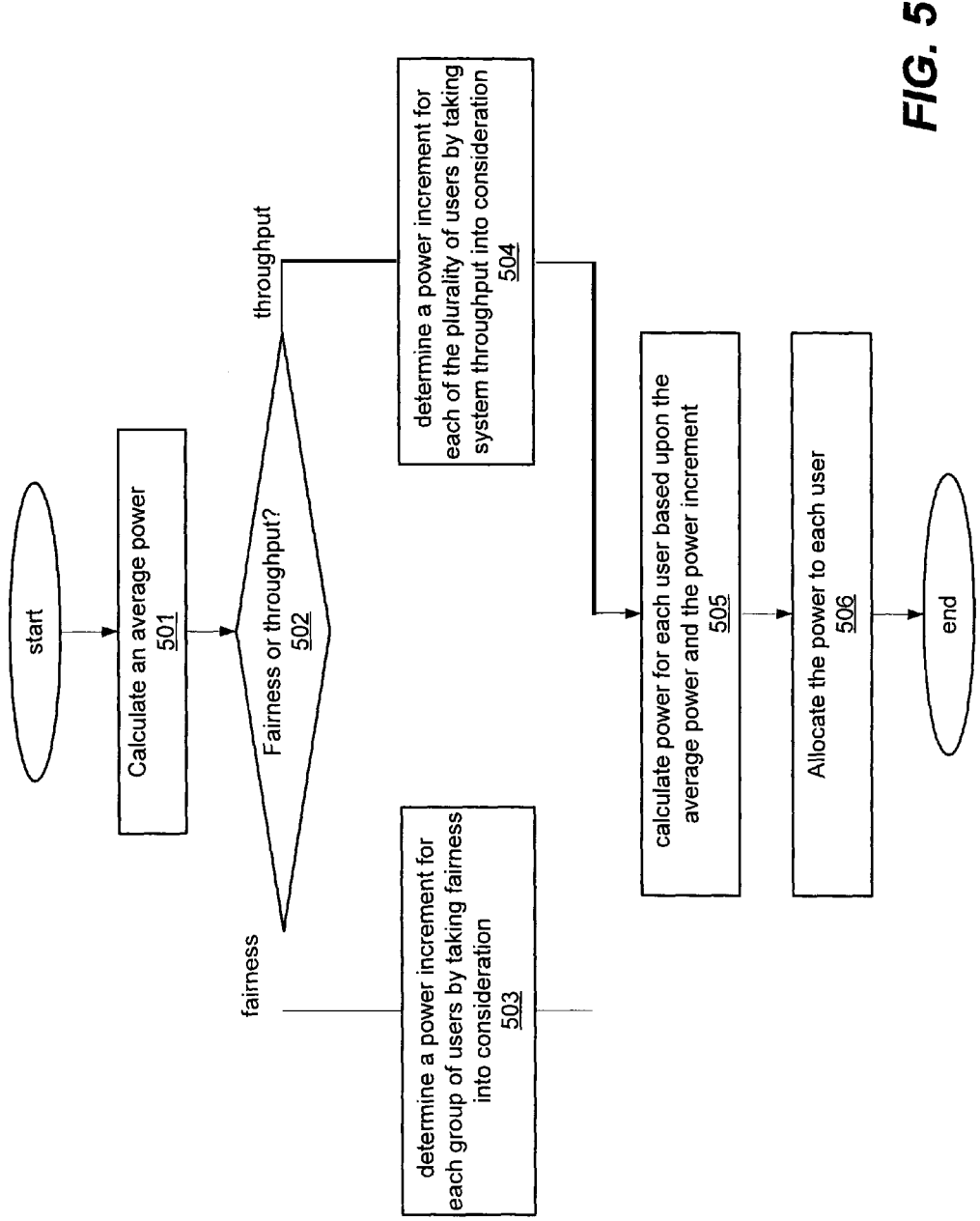
FIG. 5 shows an embodiment of a method of allocating power among the multi-users in the same resource block.

FIG. 5 shows an embodiment of a method of allocating power among the multi-users in the same resource block. In block 501, average power logic 324 of power calculating logic 322 may calculate the average power among the multiple users based upon the total power for base station 11 to communicate with the multiple users via the resource block and the number of the multiple users. In block 502, allocation scheme selecting logic 321 may select an allocation scheme from the fairness scheme and the throughput scheme, for example, based upon a user/service distribution.

If the fairness scheme is selected, power increment logic 325 of power calculating logic 322 may calculate the power increment for each user of the multiple users based upon the fairness scheme in block 503, while the total power constraint (i.e., total power is not exceedable) may be met. If the throughput scheme is selected, power increment logic 325 of power calculating logic 322 may calculate the power for each of the multiple users based upon the throughput scheme in block 504, while the total power constraint may be met.

In block 505, power calculating logic 322 may calculate power for the each user by adding the power increment of the each user to the average power. In block 506, power allocating logic 323 may allocate the power to the each user so that base station 11 may communicate with the each user under the allocated power.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method operated by a base station in a multi-user multiple-input multiple-output (MU-MIMO) communication system, comprising:

calculating an average power among a plurality of users in the MU-MIMO system based upon a total power for the base station to communicate with the plurality of users, wherein the base station communicates with each user of the plurality of users via a spatial stream assigned to the each user;

determining a power increment for the each user based upon at least one of a fairness algorithm and a throughput algorithm, wherein if the power increment is determined based upon the throughput algorithm, then determining the power increment based upon the following equation:

$$\text{MaxSum\_C} = \sum_{i}^{N} f_i\left(\dfrac{(P/N+\Delta P_i)}{I_i + \sigma_i^2}\right),$$

$$\text{while } \sum_{i}^{N} (P/N + \Delta P_i) \leq P$$

wherein, MaxSum_C represents a maximum of a throughput sum C, i represents an $i^{th}$ user, N represents a number of the plurality of users, P represents the total power, $I_i$ represents an interference for the $i^{th}$ user, $\sigma_i$ represents a white noise for the $i^{th}$ user, $f_i(\ )$ represents a throughput function, and $\Delta P_i$ represents the power increment for the $i^{th}$ user; and allocating a power to the each user based upon the average power and the power increment, wherein different users of the plurality of users having different long-term signal to interference plus noise ratios (SINRs) are allocated with different powers.

2. The method of claim 1, wherein the determining the power increment further comprises selecting a power algorithm from the fairness algorithm and the throughput algorithm.

3. The method of claim 1, wherein the determining the power increment further comprises: if the power increment is determined based upon the fairness scheme, then determining a first power increment for a first user having a first long-term SINR and determining a second power increment for a second user having a second long-term SINR, wherein the first power increment is higher than the second power increment if the first long-term SINR is lower than the second long-term SINR.

4. The method of claim 1, wherein the determining the power increment further comprises if the power increment is determined based upon the throughput scheme, then:

selecting a user from the plurality of users who has a long-term SINR in a middle range; and determining the power increment for the selected user that is the highest among the power increments for the plurality of users.

5. An apparatus of a base station in a multi-user multiple-input multiple-output (MU-MIMO) communication system, comprising:

a power calculating logic on at least one processor to calculate a power for each user of a plurality of users communicating with the base station in the MU-MIMO system, based upon an average power and a power increment, wherein the power calculating logic further comprises an average power logic to calculate the average power among the plurality of users based upon a total power for the base station to communicate with the plurality of users, and a power increment logic to determine the power increment for the each user based upon at least one of a fairness algorithm and a throughput algorithm, wherein if the power increment is determined based upon the throughput algorithm, the power increment logic is further to determine the power increment based upon the following equation:

$$\text{MaxSum\_C} = \sum_{i}^{N} f_i\left(\frac{(P/N + \Delta P_i)}{I_i + \sigma_i^2}\right),$$

$$\text{while } \sum_{i}^{N} (P/N + \Delta P_i) \leq P$$

wherein, MaxSum_C represents a maximum of a throughput sum C, i represents an $i^{th}$ user, N represents a number of the plurality of users, P represents the total power, $I_i$ represents an interference for the $i^{th}$ user, $\sigma_i$ represents a white noise for the $i^{th}$ user, $f_i()$ represents a throughput function, and $\Delta P_i$ represents the power increment for the $i^{th}$ user, and wherein different users of the plurality of users having different long-term signal to interference plus noise ratios (SINRs) are calcuated with different powers; and a power allocating logic on at least one processor to allocate the power to the each user.

6. The apparatus of claim 5, further comprising a power algorithm selecting logic to select a power algorithm from the fairness algorithm and the throughput algorithm for the power increment logic to calculate the power increment.

7. The apparatus of claim 5, wherein if the power increment is determined based upon the fairness algorithm, the power increment logic is further to determine a first power increment for a first user having a first long-term SINR and determine a second power increment for a second user having a second long-term SINR, wherein the first power increment is higher than the second power increment if the first long-term SINR is lower than the second long-term SINR.

8. The apparatus of claim 5, wherein if the power increment is determined based upon the fairness algorithm, the power increment logic is further to:

group the plurality of users into a plurality of groups based upon a long-term signal to interference plus noise ratio (SINR) for the each user, each group of the plurality of groups comprising at least one user of the plurality of users who has the long-term SINR falling into a predetermined range; and determine a first power increment for a first group of the plurality of groups and a second power increment for a second group of the plurality of groups, wherein if the at least one user of the first group has the long-term SINR higher than that for the at least one user of the second group, then the first power increment is lower than the second power increment.

9. The apparatus of claim 5, wherein if the power increment is determined based upon the throughput algorithm, the power increment logic is further to:

select a user from the plurality of users who has a long-term SINR in a middle range; and determine the power increment for the selected user that is the highest among the power increments for the plurality of users.

* * * * *